W. J. REYNOLDS.
LOCKING CHAIN FOR AUTOMOBILES.
APPLICATION FILED SEPT. 15, 1913.
1,105,925.
Patented Aug. 4, 1914
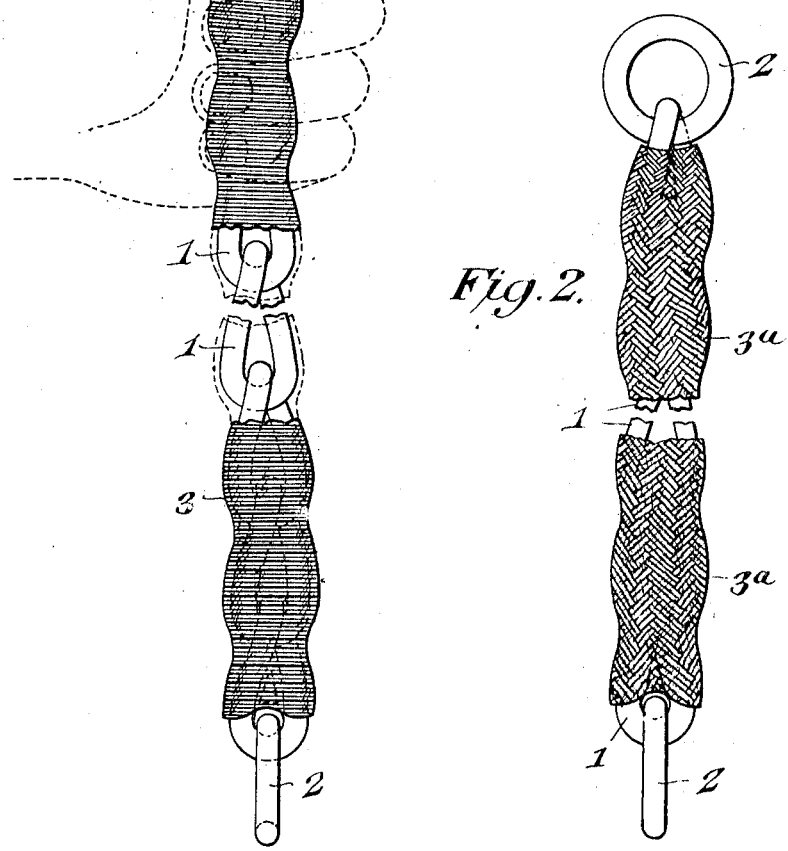
Walter J. Reynolds, INVENTOR

UNITED STATES PATENT OFFICE.

WALTER J. REYNOLDS, OF PROVIDENCE, RHODE ISLAND.

LOCKING-CHAIN FOR AUTOMOBILES.

1,105,925. Specification of Letters Patent. Patented Aug. 4, 1914.

Application filed September 15, 1913. Serial No. 789,932.

*To all whom it may concern:*

Be it known that I, WALTER J. REYNOLDS, a citizen of the United States, residing at Providence, in the county of Providence and State of Rhode Island, have invented a new and useful Locking-Chain for Automobiles, of which the following is a specification.

This invention has reference to improvements in locking chains for automobiles and its object is to provide a chain of requisite strength and flexibility and yet of sufficient stiffness to permit certain manipulations of the chain.

In accordance with the present invention there is provided a chain of appropriate length and strength to permit it to be passed through relatively fixed and relatively movable parts of an automobile running gear, so that when the ends of the chain are secured together, as by a lock, the vehicle can not be moved to any material extent. Such a chain is not at all uncommon, but chains are very flexible and it is often difficult to pass the chains through somewhat devious paths in order to cause them to embrace the parts to be locked, and it is usually necessary to reach through parts of the machine to an extent often causing soiling of the clothing of the operator. Moreover, an ordinary chain is liable to mar the vehicle and oftentimes thereby do material damage.

In accordance with the present invention the chain is covered by a close-fitting sheath hugging the chain sufficiently tight to render the highly flexible chain more or less stiff, wherefore considerable lengths of the chain will maintain a position without material bending, and the chain may, therefore, be passed through parts of the vehicle to encircle such parts without the necessity of reaching through other parts to grasp the introduced end of the chain. The sheath may be made of various materials and, moreover, serves as a protector for finished parts of the vehicle, thus preventing marring of the vehicle, as might occur where exposed portions of the chain would otherwise come into contact with painted or varnished surfaces.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is an elevation of a chain covered with a sheath of elastic material contractible upon the chain links. Fig. 2 is an elevation of a chain covered by a sheath of somewhat different material from that shown in Fig. 1.

Referring to the drawings, there is shown a chain 1 made up, as is customary, of numerous links of suitable size and strength for the purpose. The chain may be of any appropriate length, say, two or more feet, and terminates in rings 2 designed to be connected by the hasp of a padlock or any suitable part of any appropriate locking device. Between the ends of the chain the links are inclosed in a sheath 3, as indicated in Fig. 1, or 3ª as indicated in Fig. 2. In Fig. 1 the sheath 3 is a tubular sheath which may be composed of a fabric such as rubber elastic fabric, so that he normal diameter of the sheath is less than the effective diameter of the chain, wherefore the sheath hugs the chain with more or less force and conforms to an extent to the outlines of the links. In Fig. 2 the sheath 3ª is shown as made of a fabric having the threads interwoven in a manner which permits the tubular fabric to be more or less stretched to receive the chain, so that the fabric is under some expansion or tension, and consequently hugs the chain quite closely after the chain has been introduced into the tubular sheath.

The two forms of sheath shown in the drawings may be taken as typical of any suitable sheath which will hug the chain with some compressive force, thus imparting some degree of stiffness to the chain. In practice the sheath will hold the weight of several links of the chain, so that the latter may be pushed through parts of the vehicle without collapsing, and ordinarily a sufficient length of the chain will hold its position without bending to any material extent to permit the chain to be grasped at a considerable distance from one end, and the free portion between the hand and the end of the chain passed through parts to such an extent that the free end of the chain may be readily reached by the other hand of the operator without the necessity of introducing the hand through parts which the chain is to embrace. In this manner the chain may very readily be passed under the axle of the vehicle and from thence through the spokes of a wheel, and the two ends of the chain brought together to be fastened by a padlock or other fastening device without the necessity of reaching through the wheel or under the axle. Again, the chain may be passed through one of the vehicle springs and from thence through the adjacent wheel, the stiffness of the chain due to the sheath being sufficient to maintain a relatively long portion of the chain in position without materially bending to permit such manipulation of the chain. Aside from the stiffening of the chain by the sheath, which stiffening, however, does not interfere with forcibly bending the chain at any point, the sheath acts as a protector preventing the engagement of the metallic portion of the chain with parts of the vehicle liable to injury, the vehicle being generally painted or varnished where it is customary to pass a locking chain. Because of the stiffening of the chain by the sheath a vehicle may be locked in far less time than is required where an unsheathed, and consequently highly flexible chain, is employed, since the chain acts similarly to a stiff, or but slightly flexible rod. The sheathed chain, however, has the advantage that it may be bent at any point.

The chain though initially highly flexible has imparted to it by the sheath a character similar to that of a stiff rope, but has the advantage of far greater strength and durability. A good quality of welded link steel chain, galvanized or lacquered, answers the purpose of the present invention admirably, while a cotton or other fabric covering may be employed.

When an all cotton flexible tubing is employed as the sheath it is pulled over the chain and fastened at the ends to the chain. The covered chain is then put in boiling water, where it may be laid out straight for about two hours after which it is taken out and dried. This shrinks the tubing and makes it adhere very closely to the chain, thus stiffening the links, and consequently making the chain far more useful for the purposes of the invention than is an ordinary chain.

The tubing of rubber elastic fabric is made initially of smaller diameter than the chain so as to hug it quite closely under the action of the rubber strands included in the fabric, while in the case of the all cotton or other fibrous sheath shrinkage may be relied upon to cause the sheath to closely hug the chain and so stiffen it. In either case it is the close hugging of the chain by the inclosing sheath that causes it to be far more stiff than an unsheathed chain, and, therefore, capable of action in the manner herein before described.

Under some circumstances it is advisable to impregnate the sheath with a waterproofing material which may further stiffen the links of the chain, and which also protects a plain steel chain from rusting. A waterproofing and stiffening composition for the fabric may be made up in the proportions of one gallon of denatured alcohol in which is dissolved four pounds of dark lump rosin, after which one pint of boiled linseed oil is added. The chain covered with knitted tubing is placed in the solution so formed and allowed to remain for a suitable time, say, for thirty minutes, after which it is removed and hung up to drain and dry. Such an arrangement allows the use of an ungalvanized or unlacquered chain, since the treated fabric sheath protects the chain and the sheath is appropriately stiffened by the infiltration of waterproofing material, which material is somewhat flexible or elastic and at the same time sufficiently stiff, together with the stiffening action of the sheath alone, to hold a considerable length of the chain relatively straight and against bending under the action of gravity.

What is claimed is:—

1. A locking chain for automobiles provided with a flexible stiffening sheath of a diameter normally less than the effective diameter of and expanded to receive the chain, whereby when contracted about the chain it will closely hug both the edges and sides of the links.

2. A locking chain for automobiles provided with a fabric sheath of normally less diameter than the effective diameter of the chain, and contracted by its normal tendency about the links of the chain into engagement with both the edges and sides of said links to stiffen said chain.

3. A locking chain for automobiles provided with a tubular sheath of woven fabric closely hugging the chain links in edge and side engagement therewith.

4. A locking chain for automobiles provided with a tubular sheath of woven fabric closely hugging the chain links in edge and side engagement therewith and impregnated with waterproofing material.

In testimony, that I claim the foregoing as my own, I have hereto affixed my signature in the presence of two witnesses.

WALTER J. REYNOLDS.

Witnesses:
 ALBERT HAWES DAMITIO,
 MARGARET LORINDA AYERS.